United States Patent [19]
Tomikawa

[11] Patent Number: 5,140,585
[45] Date of Patent: Aug. 18, 1992

[54] STAR LOCAL-AREA NETWORK SYSTEM

[75] Inventor: Masataka Tomikawa, Tokorozawa, Japan

[73] Assignee: Kabushiki Kaisha Toshiba, Kawasaki, Japan

[21] Appl. No.: 732,479

[22] Filed: Jul. 18, 1991

[30] Foreign Application Priority Data

Jul. 19, 1990 [JP] Japan .................................. 2-189539
Jul. 19, 1990 [JP] Japan .................................. 2-189540

[51] Int. Cl.⁵ .............................................. H04J 3/26
[52] U.S. Cl. .................................. 370/60.1; 370/94.3
[58] Field of Search ............... 370/60, 92, 94.3, 60.1, 370/85.13

[56] References Cited

U.S. PATENT DOCUMENTS

| | | | |
|---|---|---|---|
| 4,633,245 | 12/1986 | Blount et al. | 340/825.03 |
| 4,646,296 | 2/1987 | Bartholet et al. | 370/124 |
| 4,672,658 | 6/1987 | Kavehrad et al. | 379/63 |
| 4,947,385 | 8/1990 | Rau | 370/14 |

Primary Examiner—Benedict V. Safourek
Assistant Examiner—Russel W. Blum
Attorney, Agent, or Firm—Finnegan, Henderson, Farabow, Garrett and Dunner

[57] ABSTRACT

A star local-area network system comprises a plurality of data stations and a central switching unit for switching the connection between the data stations. The central switching unit comprises, a plurality of ports to which a plurality of data stations are connected, an address table in which each port has a storage area for storing the address assigned to each data station, an address registration section for entering a source address which indicates one of said data stations that generates message data and is contained in the message data received from the data station in the storage area corresponding to the port which received the data, a switch installed between the plurality of ports, for switching the connection between the ports, and a switch control section for referring to the address table, to detect the port corresponding to a destination data station specified by a destination address contained in the received data and then controlling the switch so that the port which received the data can be connected to the port to which the destination data station is connected.

24 Claims, 11 Drawing Sheets

ADDRESS TABLE

T1

| PORT NUMBER | ADDRESS OF STATION | STATUS 1 |
|---|---|---|
| P1 | A | BUSY |
| P2 | B | BUSY |
| P3 | C | IDLE |
| P4 | D | IDLE |
| P5 |  |  |
| ⋮ | ⋮ | ⋮ |
| Pm | Y | IDLE |
| P | Z | IDLE |

FIG. 3

| PORT NUMBER | ADDRESS OF STATION | STATUS 1 BUSY/IDLE | STATUS 2 TYPE OF STATION | STATUS 3 PROTOCOL | STATUS 4 | |
|---|---|---|---|---|---|---|
| | | | | | TIME OF CONNECTION | TIME OF DISCONNECTION |
| P1 | | | | | | |
| P2 | | | | | | |
| P3 | | | | | | |
| P4 | | | | | | |
| P5 | | | | | | |
| --- | --- | --- | --- | --- | --- | --- |
| Pm | | | | | | |
| Pn | | | | | | |

FIG.9

STAR LOCAL-AREA NETWORK SYSTEM

BACKGROUND OF THE INVENTION

1. Field of the Invention

This invention relates to a star local-area network system, and more particularly to improvement of the central switching unit installed in a star local-area network.

2. Description of the Related Art

In star local-area network systems, communication between data stations is generally achieved by the central switching unit, which changes the connection between stations.

A typical central switching unit is a PBX, which has a plurality of input/output ports individually connected to separate data stations. When a data station requests a circuit connection, the PBX receives the circuit number of the called data station from the calling data station. The circuit number indicates the number of the input/output port of the PBX to which the called data station is connected. The PBX connects the input/output port connected to the calling data station to that connected to the called data station to establish a telecommunication circuit between the two data stations.

In a star local-area network system using a PBX as the central switching unit, each data station specifies the called data station, using the latter's circuit number.

The circuit number of the called data station, however, is determined on the basis of the input/output port to which the called data station is connected, so that when the connection of the called data station is changed to another input/output port, its circuit number is also changed. Therefore, to call a station whose input/output port has been changed, the calling station must recognize the new circuit number of the called station in advance.

As noted above, the calling data station always recognizes the numbers of the PBX physical input/output ports to which other data stations are actually connected. For this reason, it is necessary for the supervisor of the network system to inform the operator at each data station of the new numbers of other data stations.

With this situation in mind, a PBX is now available which contains an address table showing which input/output port numbers correspond to which data station names. By referring to the address table, the PBX recognizes which input/output port is connected to the data station whose name is specified by the calling data station. Therefore, the calling data station can specify the called data station by name without taking into account the number of the PBX physical input/output port connected to the called data station.

The information relating to the state of connection between data stations is entered in the address table by the supervisor beforehand. In this case, however, changes in the connection of data stations require the network supervisor to update the contents of the address table according to each new state of connection of the stations.

SUMMARY OF THE INVENTION

The object of the present invention is to provide a star local-area network system which provides full control of the communication between data stations without the need for the address table to be updated by human intervention.

The foregoing object is accomplished by a star local-area network system comprising a plurality of data stations and a central switching unit for switching the connection between the data stations. The central switching unit comprises a plurality of ports to which the plurality of data stations are connected, address table in which each port has a storage area for storing the address assigned to each data station, address registration means for entering the source address, which indicates one of said data stations that generate message data and is contained in the message data received from the data station, in the storage area corresponding to the port that received the message data, switching means installed between the plurality of ports, for switching the connection between the ports, and switch controlling means for referring to the address table, to detect the port corresponding to a destination data station specified by a destination address contained in the received message data, and then controlling the switch means so that the port which received the message data can be connected to the port to which the destination data station is connected.

In the case of the above star local-area network system, the contents of the table means are updated according to the source address contained in the data transmitted from the data station. Even when the connection of the destination data station is changed, the source data station can communicate with the destination data station by simply inserting an address indicating the destination data station as a destination address in the transmission data. This makes it unnecessary to update the address table by human intervention, thus resulting in more efficient data exchange between data stations.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims.

BRIEF DESCRIPTION OF THE DRAWINGS

The accompanying drawings, which are incorporated in and constitute a part of the specification, illustrate presently preferred embodiments of the invention, and together with the general description given above and the detailed description of the preferred embodiments given below, serve to explain the principles of the invention.

FIG. 3 shows the structure of the address table contained in the central switching unit in the star local-area network system of FIG. 1;

FIG. 9 shows an alternative structure of the address table contained in the star local-area network system of FIG. 1;

DETAILED DESCRIPTION OF THE PREFERRED EMBODIMENTS

Figure 1:
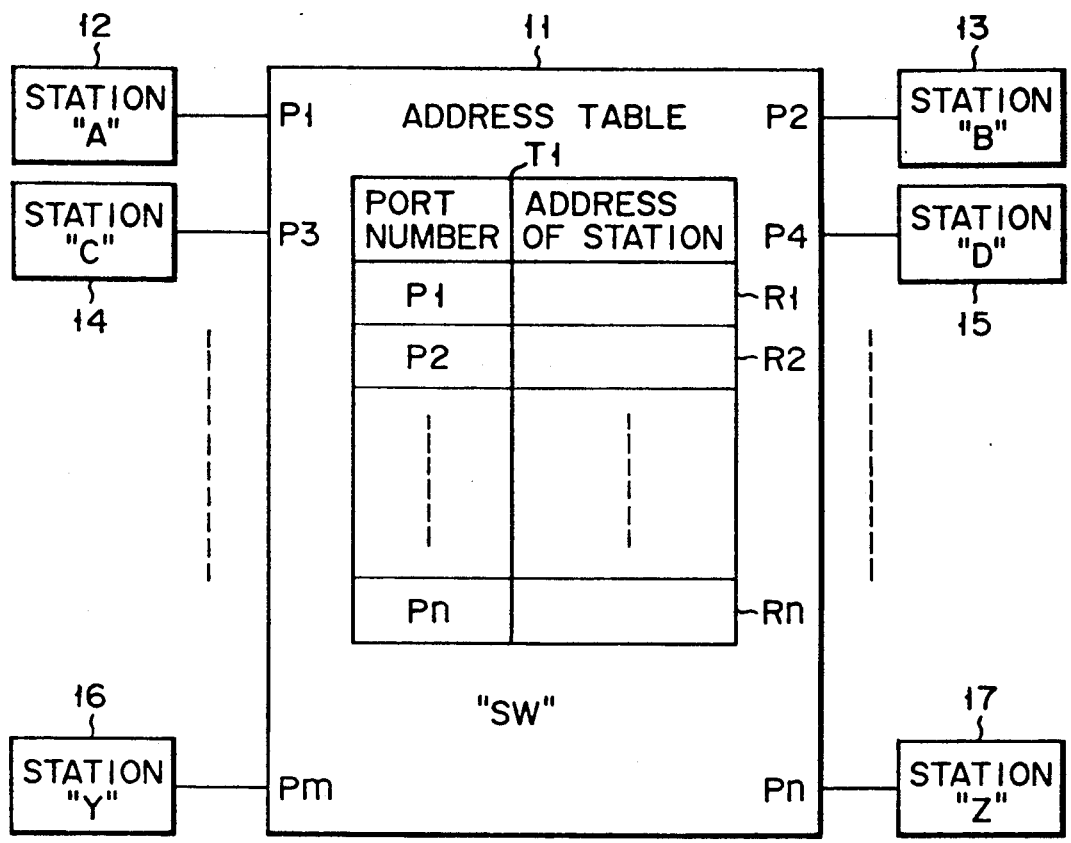
FIG. 1 is a schematic block diagram showing the structure of a star local-area network system according to an embodiment of the present invention.

FIG. 1 schematically represents the structure of a star local-area network system according to a embodiment of the present invention. The star local-area network system, which comprises a central switching unit 11 and a plurality of data stations 12 through 17, is used to provide data communication service in a limited area such as an office building, factory, laboratory, or school.

Each of data stations 12 through 17 is composed of one of various data terminals, such as a personal computer, workstation, host computer, or input/output unit (such as a printer or file system), or of a unit housing a plurality of those data terminals. The data stations 12 through 17 are all connected to the central switching unit 11.

The central switching unit 11, which has a plurality of input/output ports P1 through Pn, switches the connection between data stations 12 through 17 for communication between them. Each of the input/output ports P1 through Pn is connected to a separate data station.

In FIG. 1, as an example, the data station 12 is connected to the first input/output port P1; the data station 13 to the second input/output port P2; the data station 14 to the third input/output port P3; the data station 15 to the fourth input/output port P4; the data station 16 to the mth input/output port Pm; and the data station 17 to the nth input/output port Pn.

Each of the data stations 12 through 17 is assigned a distinct address that is identified by the unit number, unit name, or function name. The central switching unit 11 is also assigned a distinct address identifying itself. For the sake of clarity, it is assumed that the address of the central switching unit 11 is "SW" and the addresses of the data stations 12, 13, 14, 15, 16, and 17 are "A", "B", "C", "D", "Y", and "Z", respectively.

The central switching unit 11 connects the desired data stations to each other by switching the connection between the input/output ports P1 through Pn and then establish the communication between them. The switching of the connection between the input/output ports P1 through Pn is carried out using the address table T1 in the central switching unit 11. In this case, the switching system used at the central switching unit 11 may be either the circuit switching system or the packet switching system.

The address table T1 shows which input/output port is connected to which data station, and has a plurality of data storage areas R1 through Rn each of which stores, by input/output port, the address of each data station connected to one of the input/output ports P1 through Pn.

The contents of the address table T1 are prepared on the basis of source addresses contained in the frames transmitted from data stations 12 through 17. That is, when the central switching unit 11 receives data sent from the data stations 12 through 17 via the input/output ports, it enters the sender's addresses contained in the received data in the storage areas corresponding to the received input/output ports. When the data stations request data transmission, the contents of the address table is referred to for the purpose of connecting the calling data station to the called data station. Specifically, referring to the address table T1, the central switching unit 11 finds out which storage area contains the address of the called data station specified by the calling data station, and then determines the input/output port connected to the called data station.

Figure 2:
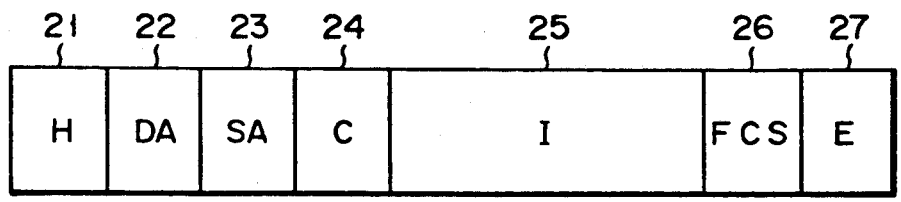
FIG. 2 shows the frame structure of data transferred within the star local area network system of FIG. 1.

FIG. 2 illustrates the structure of the frame exchanged between the data stations 12 through 17 and the central switching unit 11, or between the data stations 12 through 17 via the central switching unit 11. The frame structure is for the central switching unit 11 being a circuit switching unit. As illustrated, the frame is composed of a header field (H) 21, a destination address field (DA) 22, a source address field (SA) 23, a control data field (C) 24, a transfer data field (I) 25, a frame check sequence field (FCS) 26, and an end field (27).

The header field (H) 21, used for frame- and bit-synchronization, indicates the starting position of a frame. The destination address field (DA) 22 specifies the called station, the field (DA) containing one of the addresses "A", "B", . . . , "Z" of data stations 12 through 17 or the address "SW" of the central switching unit 11. The source address field (SA) 23 specifies the calling station, the field (SA) 23 containing one of the address "A", "B", . . . , "Z" of data stations 12 through 17 or the address "SW" of the control switching unit 11.

The control data field (C) 24 contains various control data required for data transfer between the switching unit 11 and the data stations 12 through 17 or between the data stations 12 through 17, including a registration request command requesting the entering of an address in the address table T1, a connection request command requesting the connection of the communication circuit with the called station, and a disconnection request command requesting the disconnection of the communication circuit.

The transfer data field (I) 25 contains actual information (picture data, message data, or file data) transferred between the switching unit 11 and the data stations 12 through 17 or between the data stations 12 through 17. The frame check sequence filed (FCS) 26 is used for detecting frame errors. The end field 27 indicates the end position for frame- and bit-synchronization.

FIG. 3 shows a concrete structure of the address table T1. The table T1 is designed so that information (status 1) on the usage of the input/output ports P1 through Pn.

The contents of the address table T1 in FIG. 3 shows that the telecommunication circuit connecting the input/output ports P1 and P2 is set for communication between the data station 12 with address "A" and the data station 13 with address "B", while the other input/output ports P3 through Pn are idle.

The circuit switching operation of the central switching unit 11 will now be explained.

Figure 4:
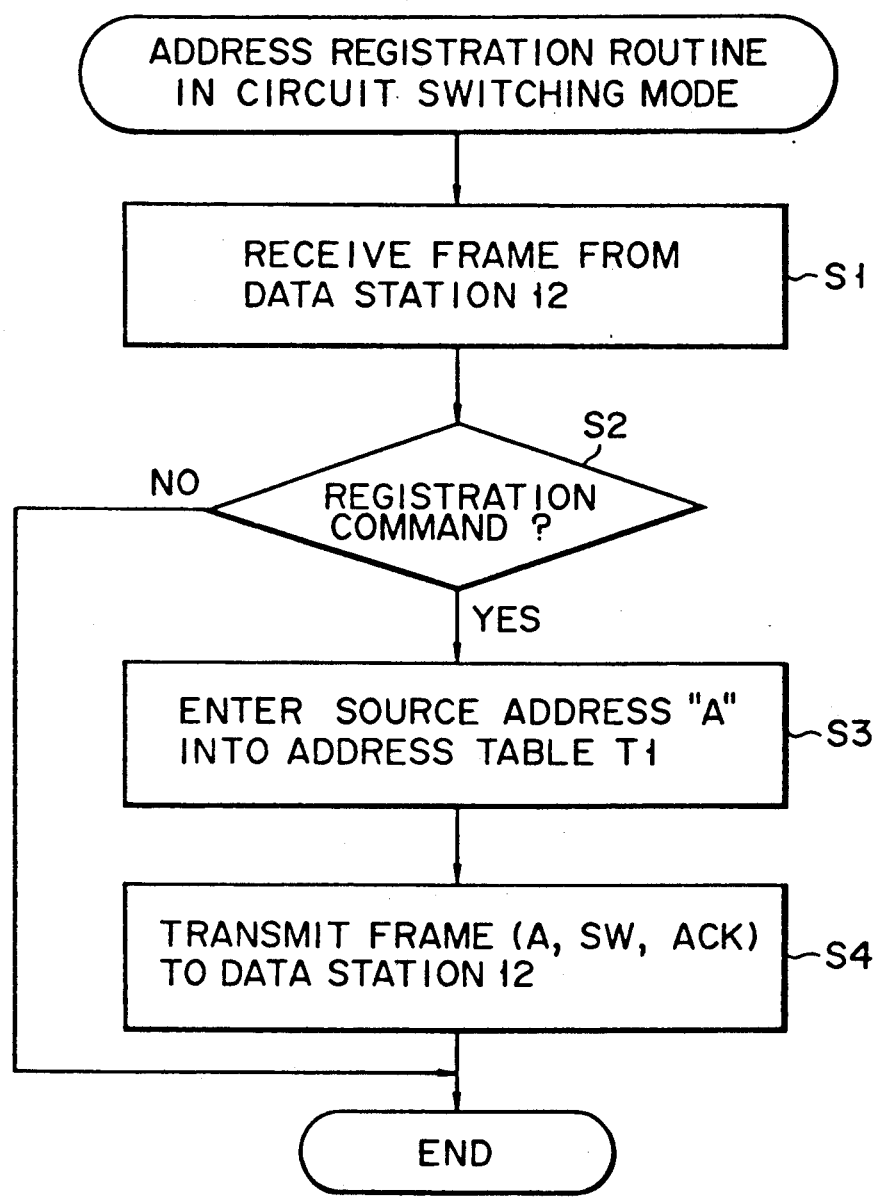
FIG. 4 is a flowchart showing the operation of entering station addresses in the address table of FIG. 3.

First, referring to FIGS. 4 and 5, an example of entering addresses in the address table T1 will be described. It is assumed here that the data station 12 assigned address "A" is connected to the input/output port P1 of the central switching unit 11 and the data station 13 assigned address "B" is connected to the input/output port P2 of the unit 11.

Figure 5:
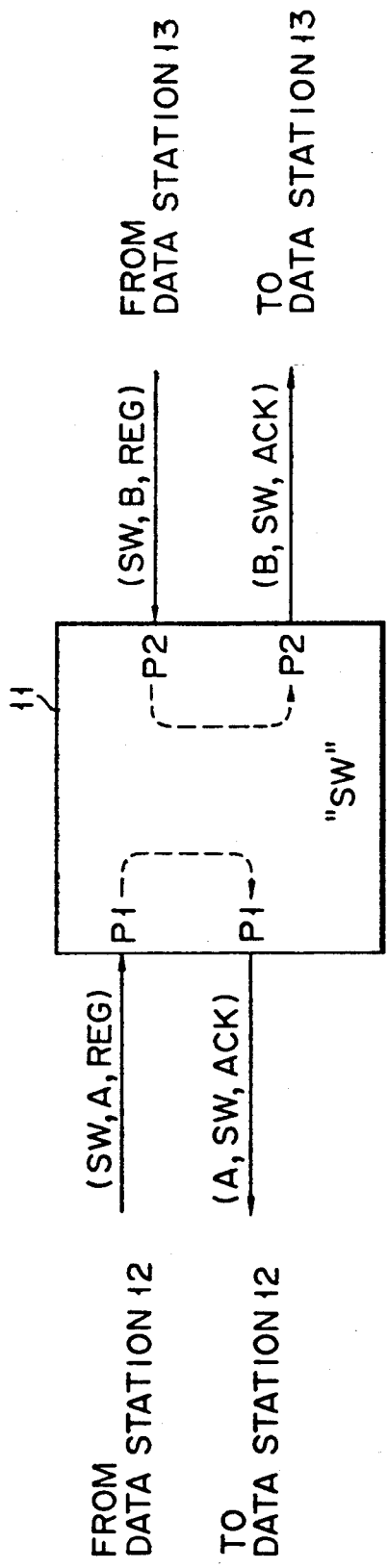
FIG. 5 is an explanatory diagram of the data transfer between the central switching unit and the data station during entry of station addresses in the address table of FIG. 3.

As shown in FIG. 5, the data station 12 transmits to the input/output port P1 of the central switching unit 11 a frame in which address "SW" is set in the destination address field (DA) 22, address "A" in the source address field (SA) 23, and a registration command "REG" in the control data field (C) 24. The central switching unit 11 receives the frame from the data station 12 via the input/output port P1 (step 1), and then judges whether or not the data station 12 requests address registration depending on whether or not the received frame contains a registration command "REG" requesting address registration (step 2).

When it is found that the received frame contains a registration command "REG", the central switching unit 11 enters the sender address "A" in the sender address field (SA) 23 of the received frame in the storage area R1 corresponding to the input/output port P1 of the address table T1 (step S3).

When the registration of the address is completed, in order to tell the data station 12 that the address registration has been carried out properly, the central switching unit 11 transmits to the data station 12 a frame in which address "A" is set in the destination address field (DA) 22, address "SW" in the source address field (SA) 23, and an affirmative response command "ACK" in the control data field (C) 24 (step S4).

Similarly, as illustrated in FIG. 5, the data station 13 transmits to the input/output port P2 of the central switching unit 11 a frame in which address "SW" is set in the destination address field (DA) 22, address "B" in the source address field (SA) 23, and a registration command "REG" in the control data field (C) 24. Receiving the frame, the central switching unit 11 enters address "B" contained in the source address field (SA) 23 in the storage area R2 corresponding to the input/output port P2 of the address table T1. When the registration of the address is completed, in order to tell the data station 13 that the address registration has been carried out properly, the central switching unit 11 transmits to the data station 13 a frame in which destination identification information "B" is set in the destination address field (DA) 22, source identification information "SW" in the sender address field (SA) 23, and a response command "ACK" in the control data field (C) 24.

In this way, the entering of addresses in the address table T1 is performed for each data station. However, addresses are not entered in the storage areas corresponding to the input/output ports not connected to data stations, which causes those storage areas to remain empty.

Figure 6:
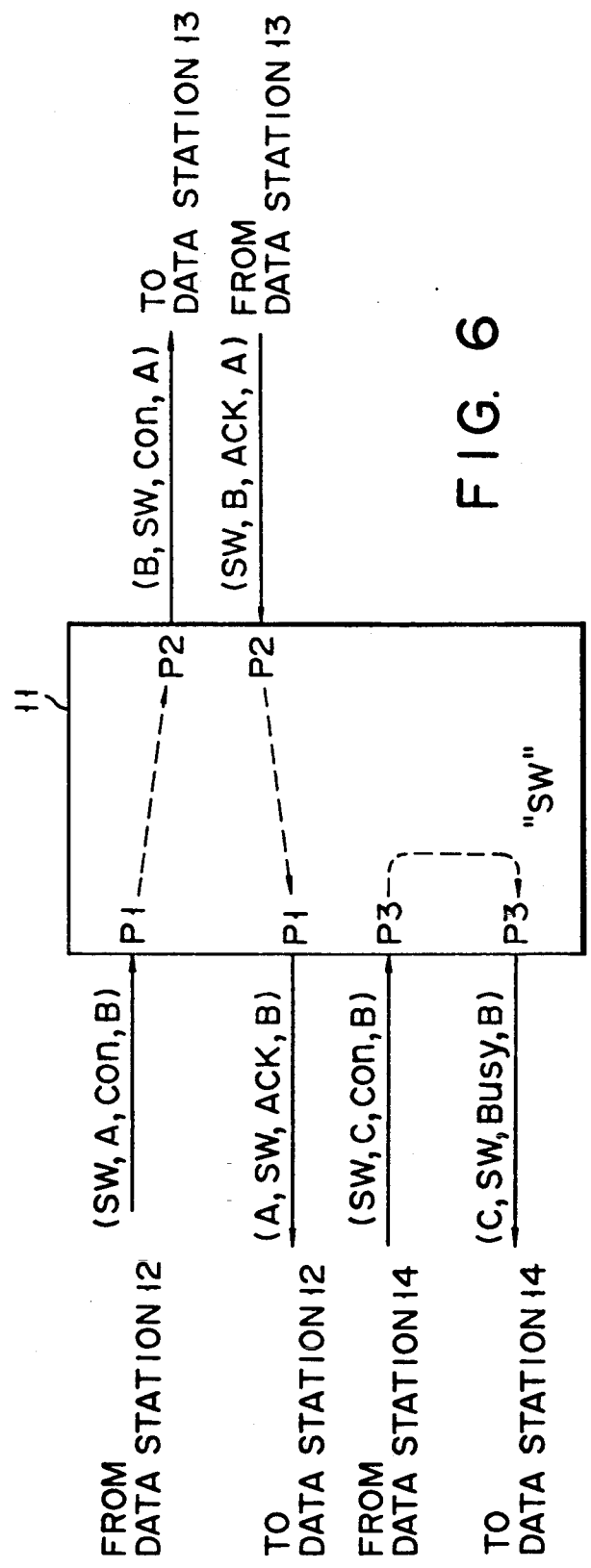
FIG. 6 is an explanatory diagram of the operation of the central switching unit in the circuit connection phase.

Referring to FIG. 6, the connecting operation of the telecommunication circuit between the data stations 12 and 13 will now be explained.

As shown in FIG. 6, the data station 12 transmits to the input/output port P1 of the central switching unit 11 a frame in which address "SW" is set in the destination address field (DA) 22, address "A" in the sender address field (SA) 23, and a connection request command "CON" and the called station address "B" in the control data field (C) 24. Receiving the frame, the central switching unit 11 sets the status corresponding to the input/output port P1 of the address table T1 for busy, and at the same time, determines that the data station 13 with address "B" is connected to the input/output port P2, by referring to the address table T1. Referring to the status corresponding to the input/output port P2 and finding that it is idle, the central switching unit 11 transmits from the input/output port P2 to the data station 13 a frame in which address "B" is set in the destination address field (DA) 22, address "SW" in the source address field (SA) 23, a connection request command "CON" and calling station address "A" in the control data field (C) 24, and at the same time, sets the status corresponding to the input/output port P2 of the address table T1 for busy.

In this state, it is assumed that the data station 14 requests telecommunication circuit connection with the data station 12, that is, the data station 14, as shown in FIG. 6, transmits to the input/output port P3 of the central switching unit 11 a frame in which address "SW" is set in the destination address field (DA) 22, address "C" in the source address field (SA) 23, and a connection request command "CON" and called station address "B" in the control data field (C) 24.

Under such conditions, the central switching unit 11 refers to the address table T1 and recognizes that the data station 13 with address "B" is connected to the input/output port P2 and then that the input/output port P2 is busy. As a result of this, the central switching unit 11 transmits from the input/output port P3 to the data station 14 a frame in which address "C" is set in the destination address field (DA) 22, address "SW" in the source address field (SA) 23, a busy command "BUSY" and busy data station address "B" in the control data field (C) 24, which informs the data station 14 that the data station 13 is busy.

The data station 13 returns an affirmative response signal to the connection request to the switching unit 11. Specifically, the data station 13 transmits to the central switching unit 11 a frame in which address "SW" is set in the destination address field (DA) 22, address "B" in the source address field (SA) 23, and an affirmative response command to the connection request "ACK" and connection request issuer address "A" in the control data field (C) 24. The central switching unit 11 responds to the response signal from the data station 13, transmitting from the input/output port P1 to the data station 12 a frame in which address "A" is set in the destination address field (DA) 22, address "SW" in the source address field (SA) 23, an affirmative response command to the connection request "ACK" and the affirmative response sender address "B" in the control data field (C) 24.

In this way, the communication circuit between the data stations 12 and 13 is established or the input/output ports P1 and P2 are connected to each other.

Figure 7:
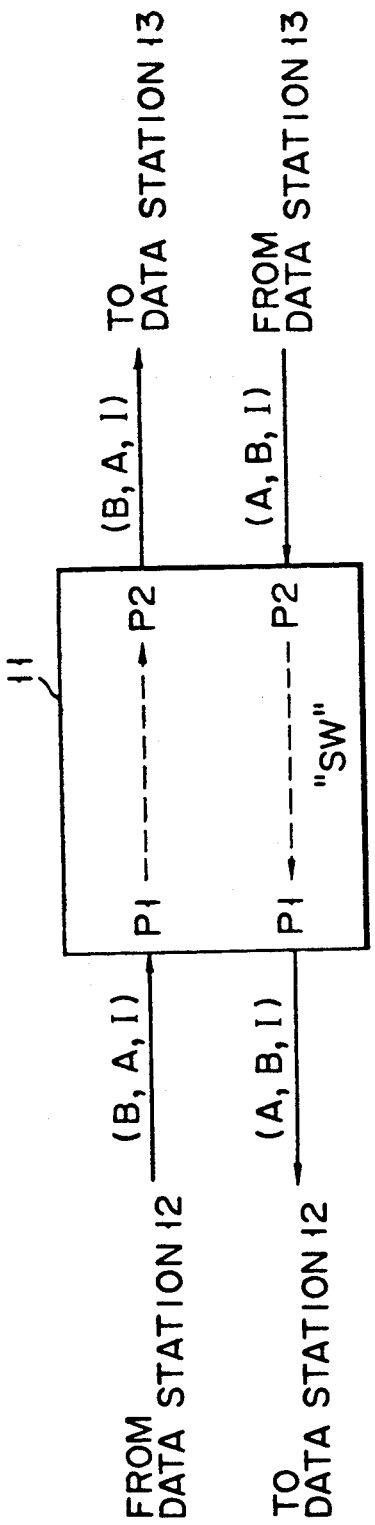
FIG. 7 is an explanatory diagram of the operation of the central switching unit in the data transfer phase.

Next, actual data transfer between the data stations 12 and 13 will be described, referring to FIG. 7.

With the input/output ports P1 and P2 connected to one another, the frame transmitted from the data station 12, or the frame in which address "B" is set in the destination address field (DA) 22, address "A" in the source address field (SA) 23, and specified information in the transfer data field (I) 24 is transferred as it is to the data station 13 via the central switching unit 11. In addition, the frame from the data station 13, or the frame in which address "A" is set in the destination address field (DA) 22, address "B" in the source address field (SA) 23, and specified information in the transfer data field (I) 24 is transferred as it is to the data station 12 via the central switching unit 11.

Figure 8:
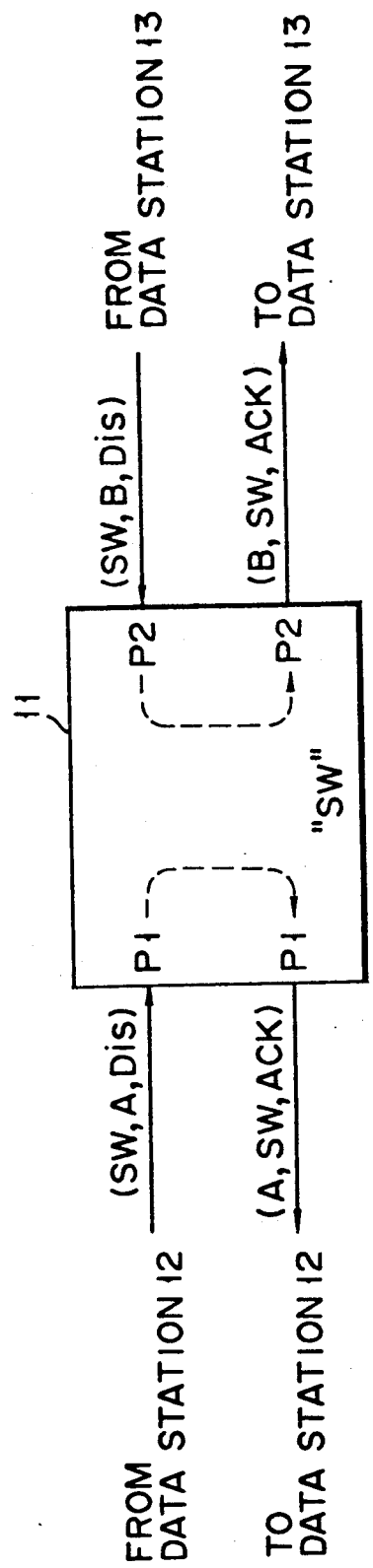
FIG. 8 is an explanatory diagram of the operation of the central switching unit in the circuit disconnection phase.

Referring to FIG. 8, the disconnecting operation of the communication circuit will be explained.

After the data transfer is completed, the data station 12, as shown in FIG. 8, transmits to the central switching unit 11 a frame in which address "SW" is set in the destination address field (DA) 22, address "A" in the source address field (SA) 23, and a disconnection request command "DIS" in the control data field (C) 24. Similarly, as shown in FIG. 8, the data station 13 transmits to the central switching unit 11 a frame in which address "SW" is set in the destination address field (DA) 22, address "B" in the source address field (SA) 23, and a disconnection request command "DIS" in the control data field (C) 24.

Receiving these frames, the central switching unit 11 cuts off the connection between the input/output ports P1 and P2 and changes the statuses corresponding to the input/output ports P1 and P2 in the address table T1 from busy to idle. Then, the central switching unit 11 transmits to the data station 12 a frame in which address "A" is set in the destination address field (DA) 22, address "SW" in the source address field (SA) 23, and an affirmative response command to the disconnection request "ACK" in the control data field (C) 24. It also transmits to the data station 13 a frame in which address "B" is set in the destination address field (DA) 22, address "SW" in the source address field (SA) 23, and an affirmative response command to the disconnection request "ACK" in the control data field (C) 24.

The central switching unit 11 cuts off the connection between the input/output ports P1 and P2 to disconnect the communication circuit between the data stations 12 and 13.

As described above, in the star local-area network system according to the embodiment, addresses are automatically entered in the address table T1 according to the address registration command from the data stations 12 through 17. Therefore, when the connection of a data station is changed to another input/output port, the contents of the address table T1 are automatically updated according to the registration command from the data station. As a result, even when the connection of a data station is changed, it is not necessary to update the address table T1 by human intervention, which achieves an efficient data exchange between the data stations.

FIG. 9 shows a modification of the address table T1 of FIG. 3. The address table T2 contains a second to a fourth status information as well as a first status information in the address table T1 of FIG. 3.

The second status information represents the types of data stations connected to the input/output ports P1 through Pn. The data station types include personal computer, workstation, host computer, facsimile, and file system. The second status information, for example, is used to allow the central switching unit 11 to inform the calling data station of the type of the called data station.

The third status information indicates the communication protocols peculiar to the data stations connected to the input/output ports P1 through Pn. This status information, for example, is used to allow the central switching unit 11 to inform the calling data station of the protocol for the called data station. In this case, when the calling data station has a plurality of communication protocols, it can transmit data according to the desired party's protocol by selecting the appropriate protocol.

The fourth status information shows the circuit connection time and disconnection time for each of the input/output ports P1 through Pn. This status information, for example, is used to enable the central switching unit 11 to monitor circuit usage, including traffic, for each of the input/output ports P1 through Pn.

Figure 10:
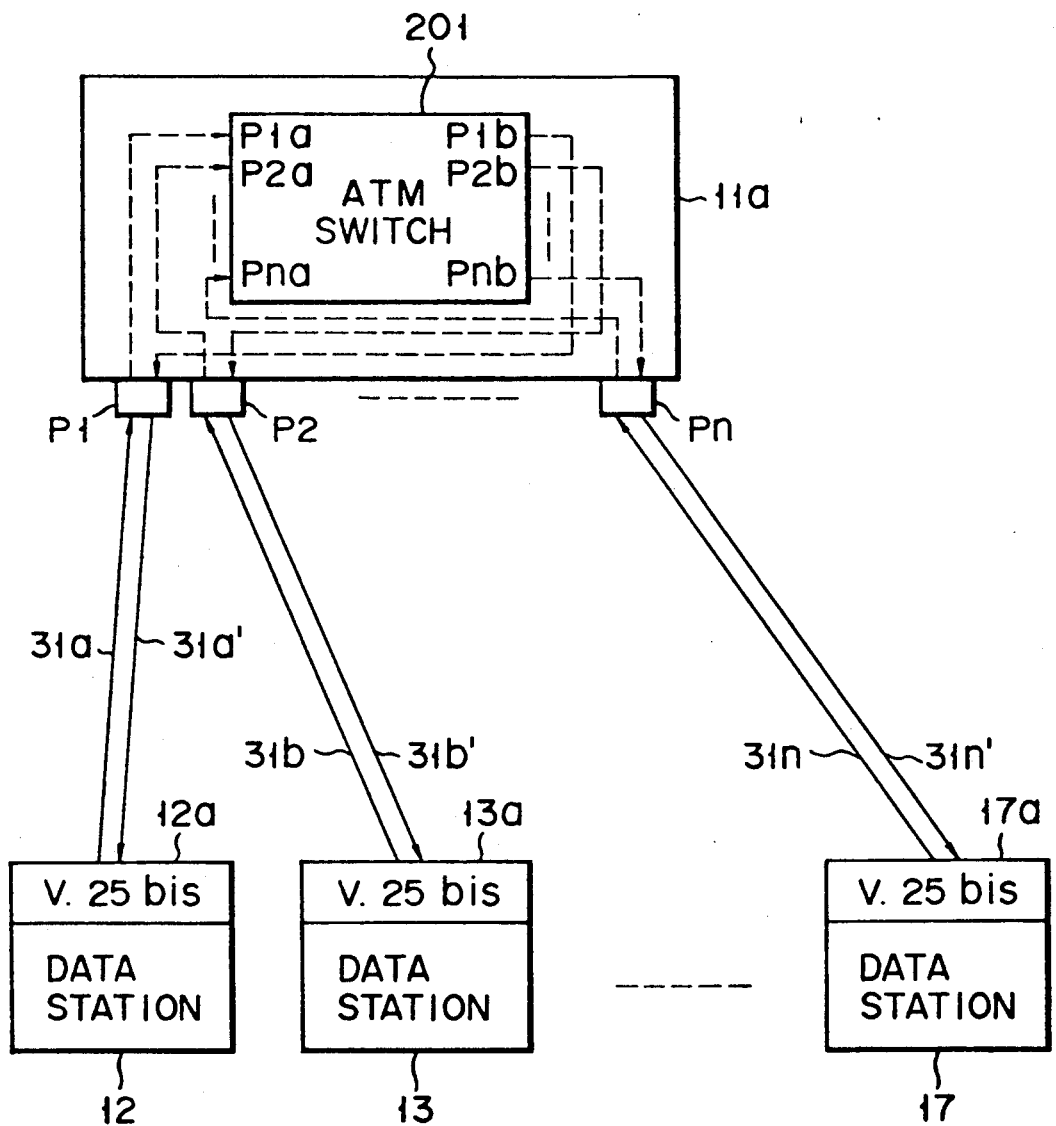
FIG. 10 is a block diagram showing a star local-area network system which is identical to that of FIG. 1, except that it employs a line switching unit.

Referring to FIG. 10, a concrete structure of the star local-area network system of FIG. 1 will now be explained. The network system of FIG. 10 corresponds to a circuit switching mode network system.

The star local-area network system uses a plurality of pairs of optical fiber cables $31a$, $31a'$, $31b$, $31b'$, ..., $31n$, $31n'$ as network transmission mediums. The data stations 12 through 17 are connected in two way to the input/output ports P1 through Pn of the circuit switching unit $11a$ via the corresponding optical-fiber transmission line pair. That is, the data station 12 is connected in two way communication to the input/output port P1 of the circuit switching unit $11a$ via a pair of optical fiber transmission lines $31a$ and $31a'$; the data station 13 to the input/output port P2 via a pair of optical fiber transmission lines $31b$ and $31b'$; and the data station 17 to the input/output port Pn via a pair of optical fiber transmission lines $31n$ and $31n'$.

The data stations 12 through 17 each have communication units $12a$ through $17a$ that perform data transmission with/reception from the central switching unit $11a$ according to the V. 25 bis procedure recommended by CCITT. The line switching unit $11a$, as stated above, receives the frames transferred from the data stations 12, 13, ..., 17 via the optical fiber transmission lines $31a$, $31b$, ..., $31n$, and transfers the received frames to the data stations specified by the destination address in the frames. In this case, the circuit switching unit $11a$ refers to the address table T2 of FIG. 9 to sense which input/output port is connected to the desired data station.

The circuit switching unit $11a$ is provided with an asynchronous transfer mode (ATM) switch 201. The ATM switch 201 allows data exchange between the data stations 12 through 17 by changing the connection between the input/output ports P1 through Pn.

Figure 11:
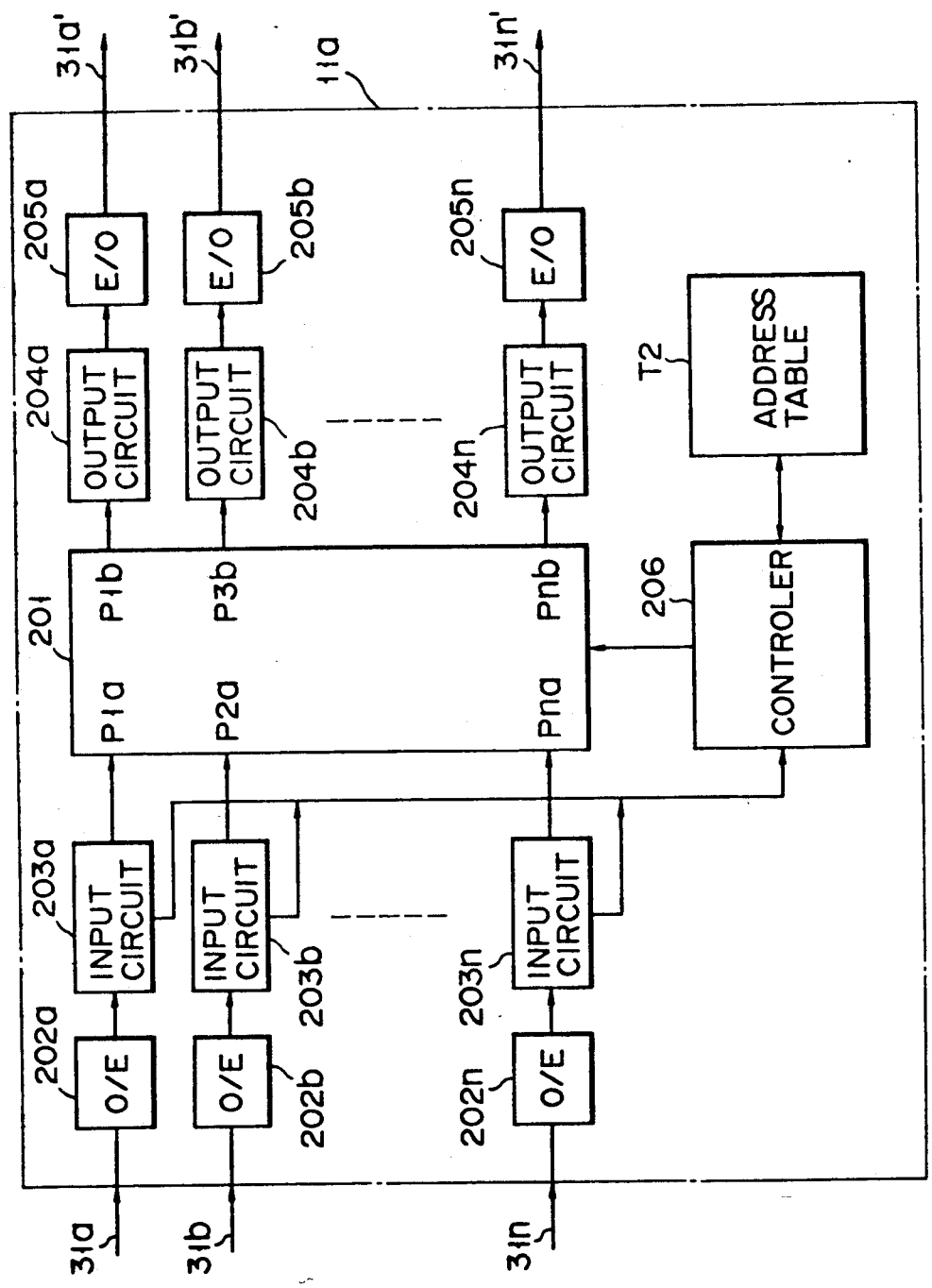
FIG. 11 is a block diagram showing the structure of the line switching unit contained in the star local-area network system of FIG. 10.

FIG. 11 illustrates a more concrete structure of the circuit switching unit $11a$ of FIG. 10.

As illustrated, the circuit switching unit $11a$, in addition to the ATM switch 201, contains photoelectric converters (O/E) $202a$ through $202n$, input-signal processing circuits $203a$ through $203n$, output-signal processing circuits $204a$ through $204n$, electro-optic converters (E/O) $205a$ through $205n$, an address table T2, and a controller 206.

The photoelectric converters (O/E) $202a$ through $202n$ convert an optical signal supplied through the optical fiber transmission lines $31a$ through $31n$ into an electric signal, and then supplies the electric signal to each of the input signal processing circuits 203a through 203n. The input signal processing circuits 203a through 203n perform frame-synchronizing of the input signals from the photoelectric converters (O/E) 202a through 202n to pick up from those frames the necessary information including source address, destination address, and transfer control information, and then transmits them to the controller 206 and supplies the received frames to the ATM switch 201.

The ATM switch 201 is provided with a matrix switch that selectively connects each of the input terminals P1a through Pna to the each of output terminals P1b through Pnb. With the switching of the matrix switch, the ATM switch selectively transmits the frames received from the input signal processing circuits 203a through 203n to the output-signal processing circuits 204a through 204n. The switching operation of the matrix switch is controlled by the controller 206.

The output-signal processing circuits 204a through 204n receive the frame transferred from the ATM switch 201 and then supply it to the electro-optic converters (E/O) 205 a through 205n. The electro-optic converters (E/O) 205a through 205n convert the received frame into an optical signal and then supply it to the optical fiber transmission lines 31a' through 31n'.

The controller 206 has the function of entering addresses in the address table T2 according to the source addresses supplied from the input-signal processing circuits 203a through 203n as well as the function of controlling the switching operation of the ATM switch 201 using the address table T2 in order to carry out the connection or disconnection of communication circuit in the circuit switching mode. It also has the function of referring to the address table T2 to find out which one of output terminals P1b through Pnb is under data transfer and then stopping the data station, generating a request to be connected with the output terminal now transferring data, from transmitting the frame.

Figure 12:
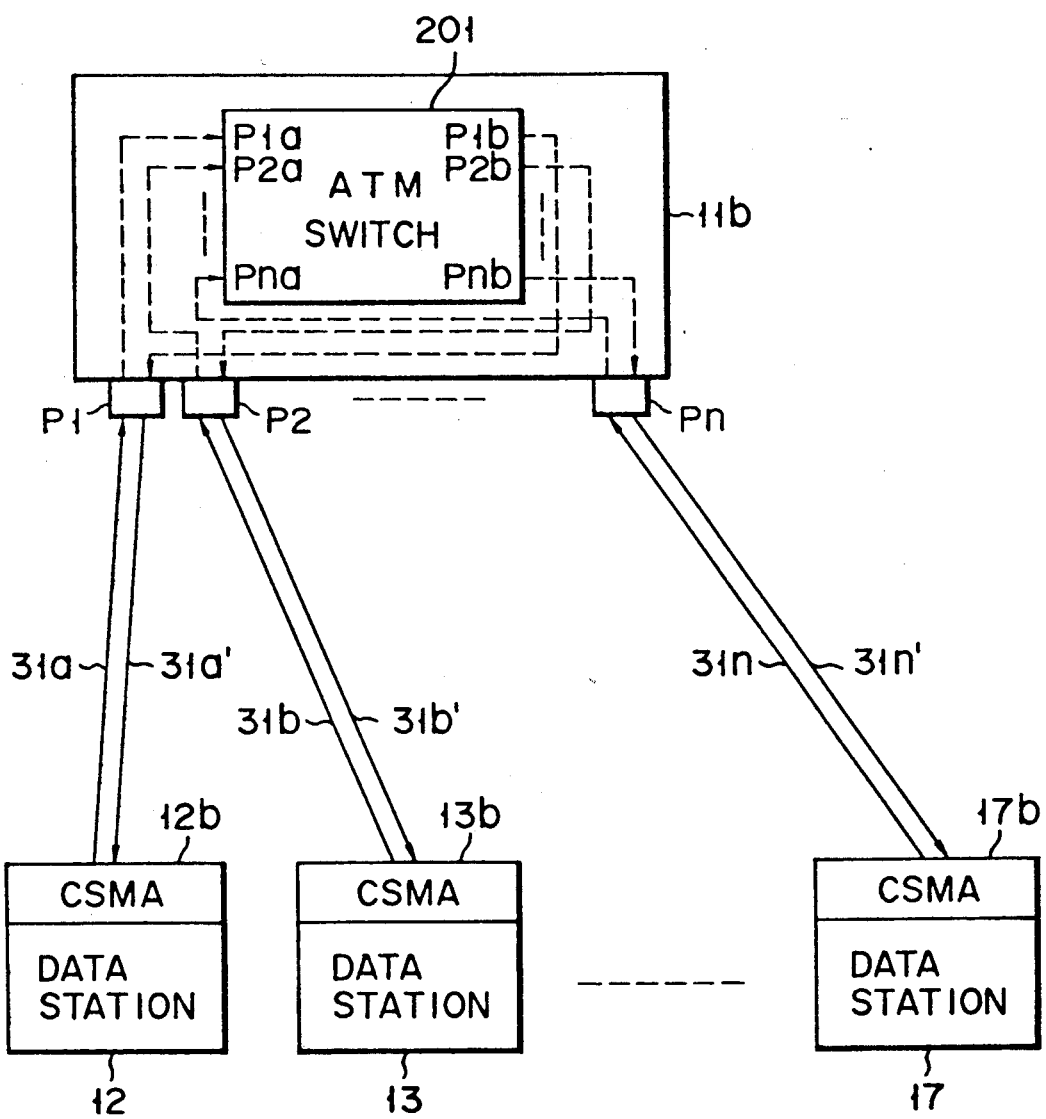
FIG. 12 is a block diagram showing a star local-area network system which is identical to that of FIG. 1, except that it employs a packet switching unit.

Referring to FIG. 12, another concrete structure of the star local-area network system of FIG. 1 will be explained. The network system of FIG. 12 corresponds to a packet switching-mode network system.

In this type of a star local-area network system, to function as a packet-mode data terminal, the data stations 12 through 17 each have communication units 12b through 17b that perform data transmission/reception with the packet switching unit 11b by CSMA (carrier sense multi access) techniques according to the IEEE standards.

That is, each of the data stations 12 through 17 senses the presence and absence of data transmitted from the packet switching unit 11b, and can transmit data to the packet switching unit 11b only when it has not received data from the switching unit 11b. For example, the data station 12 senses the presence/absence of data supplied to the data station 12 from the packet switching unit 11b via the optical fiber transmission line 31a', and can transmit data to the switching unit 11b via the optical fiber transmission line 31a only when data has not been supplied from the switching unit 11b.

The packet switching unit 11b receives the frames supplied from the data stations 12, 13, . . . , 17 via the optical fiber transmission lines 31a, 31b, . . . , 31n, and stores and switches the received frames in the packet switching mode. Like the aforementioned circuit switching unit 11a, the packet switching unit 11b is provided with an asynchronous transfer mode (ATM) switch 201. The ATM switch 201 allows data exchange between the data stations 12 through 17 by changing the connection between the input/output ports P1 through Pn.

Figure 13:
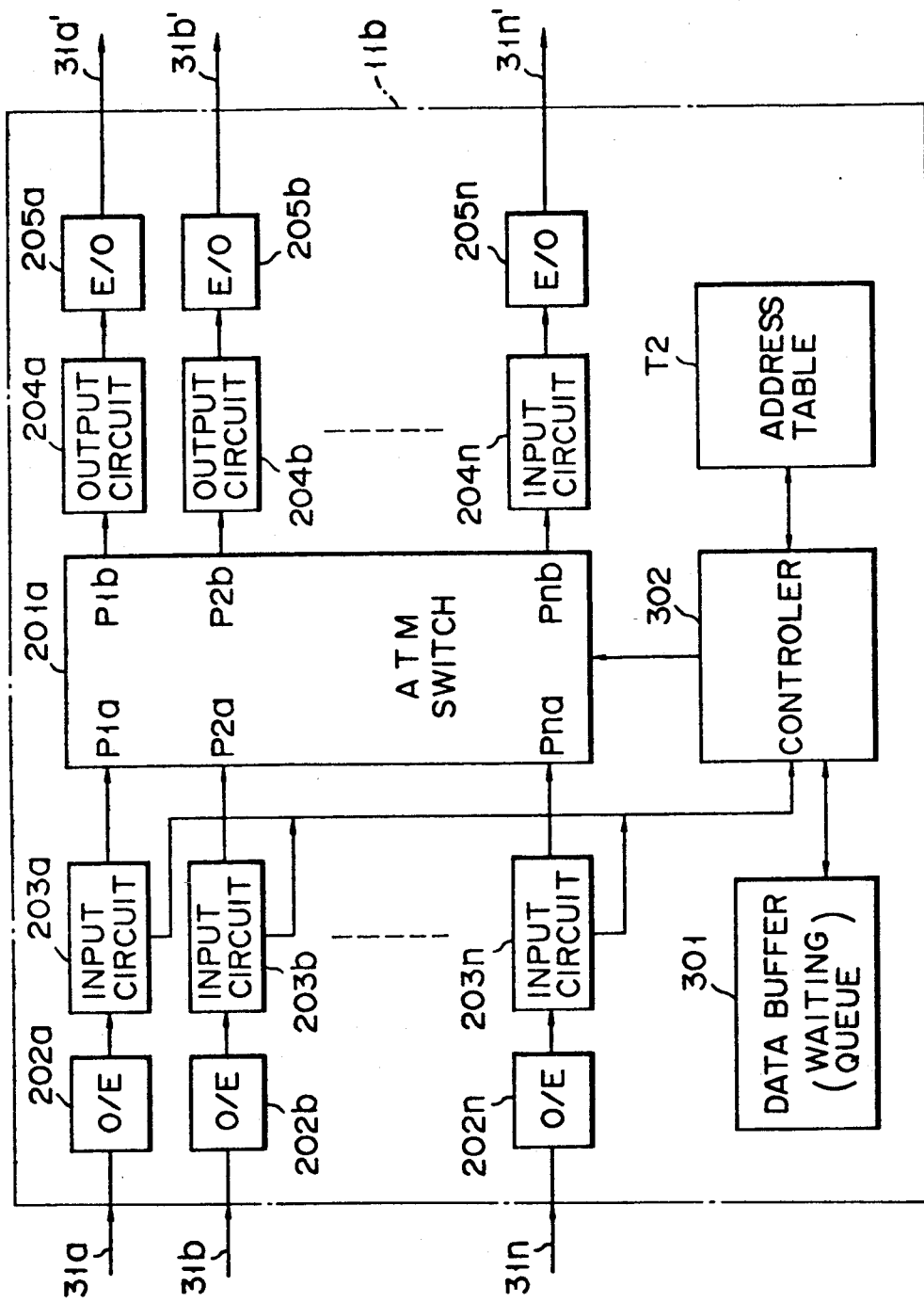
FIG. 13 is a block diagram showing the structure of the packet switching unit contained in the star local-area network system of FIG. 12.

FIG. 13 illustrates a more concrete structure of the packet switching unit 11b of FIG. 12. The packet switching unit 11b differs from the circuit switching unit 11a of FIG. 11 as mentioned below.

That is, the packet switching unit 11b has a data buffer 301 added to the circuit switching unit 11a with the controller 206 being replaced with a controller 302. The data buffer 301 is used to store the transmission requests of received frames. The controller 302 controls the switching operation of the ATM switch 201 using the address table T2 so that the connection or disconnection of communication circuit may be carried out in the packet switching mode. It also enters addresses in the address table T2 according to the source addresses supplied from the input signal processing circuits 203a through 203n.

Figure 14:
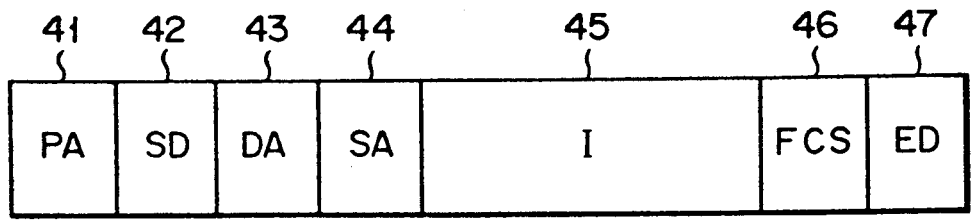
FIG. 14 shows the frame structure of data transferred within the star local-area network system of FIG. 12.

FIG. 14 shows the data structure of a frame transferred within the packet switching network of FIG. 12.

The frame is made up of a preamble field (PA) 41, a start delimiter field (SD) 42, a destination address field (DA) 43, a source address field (SA) 44, an information field (I) 45, a frame check sequence field (FCS) 46, and an end delimiter field (ED) 47.

A synchronous symbol for frame reception is set in the preamble field (PA) 41, while a frame start symbol is set in the start delimiter field (SD) 42. A destination address is set in the destination address field (DA) 43 and a source address in the source address field (SA) 44. Information to be transferred by frame is set in the information field (I) 45, an error detecting symbol in the frame check sequence field (FCS) 46, and a frame end symbol in the end delimiter field (ED) 47.

The switching operation of the packet switching unit 11b of FIG. 13 will be explained.

It is assumed that the data station 12 connected to the input/output port P1 of the packet switching unit 11b transmits data to the data station 13 connected to the input/output port P2.

Confirming that there is no data transfer through the optical fiber transmission line 31a' from the packet switching unit 11b, the data station 12 transmits a frame with the structure of FIG. 14 to the packet switching unit 11b via the optical fiber transmission line 31a. The packet switching unit 11b converts the optical signal input from the optical fiber transmission line 31a into an electric signal at the photoelectric converters 202a, and then supplies it to the input signal processing circuit 203a. The input signal processing circuit 203a achieves reception-cock synchronization using the preamble field (PA) and when detecting the start delimiter field (SD) 42, informs the controller 302 that the data station 12 has requested the frame connection.

Figure 15:
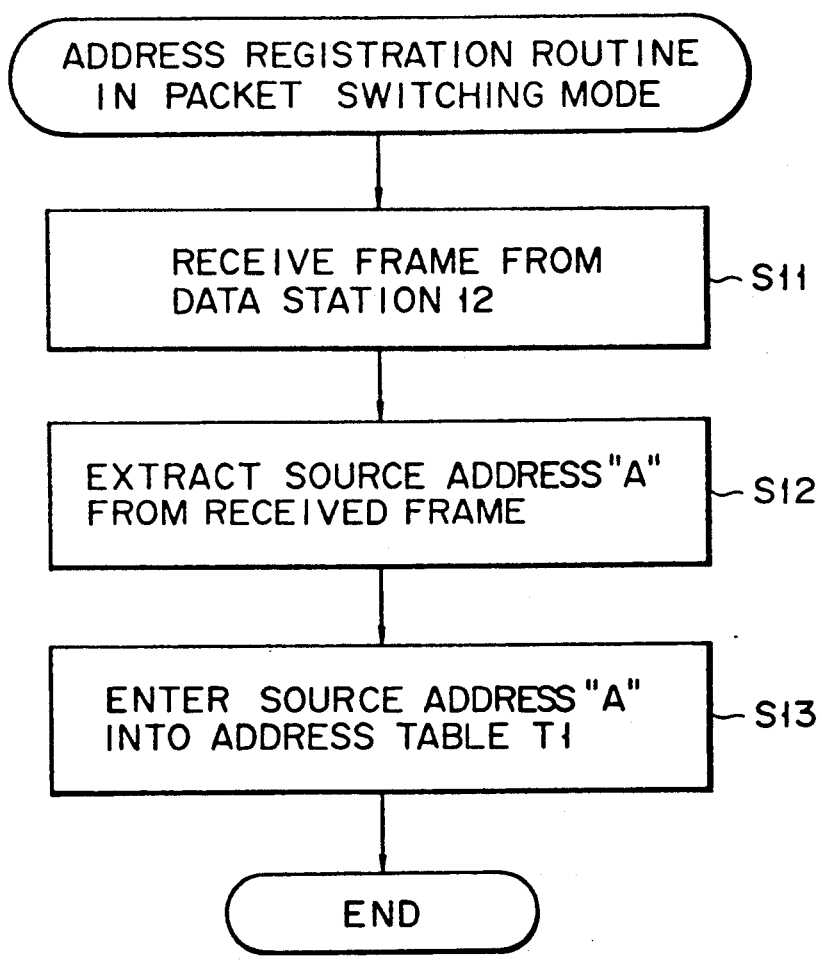
FIG. 15 is a flowchart showing the operation of entering station addresses in the address table used in the packet switching unit of FIG. 14.

In response to the notice from the input-signal processing circuit 203a, the controller 302 executes the address registration routine of FIG. 15.

Specifically, receiving the notice from the input signal processing circuit 203a, the controller 302 then receives a frame from the processing circuit 203a (step S11), and extracts the source address field (SA) from the frame (step S12). The controller 302 then enters the source address "A" in the source address field (SA) 44 in the storage area corresponding to the input/output port P1 of the address table T2 (step S13).

After this, referring to the address table T2, the controller 302 determines which input/output port has the received frame. That is, the controller 302 first sets the first status corresponding to the input/output port P1 of the address table T2 for busy and at the same time, refers to the address table T2 to sense that the data station 13 with address "B" specified by the destination address field (DA) 43 is connected to the input/output port P2. The controller 302 then refers to the first status corresponding to the input/output port P2, and if it is idle, controls the ATM switch 201 to connect the input terminal P1a to the output terminal P2b.

The ATM switch 201 connects the input terminal P1a to the output terminal P2b under the control of the controller 302 so that the input-signal processing circuit 203a may transfer a fixed size of data to the output-signal processing circuit 204b. The data transferred to the output-signal processing circuit 204b is converted into an optical signal at the electro-optic converter 205b and then transmitted to the data station 13 in frame form via the optical fiber transmission line 31b'.

When input/output port P2 is used, the controller 302 stores the connection request from the data station 12 in the data buffer (a queue) 301. In this case, because the input terminal P1a of the ATM switch is not connected to any output terminal, the frame sent from the data station 12 is left in the input signal processing circuit 203a. The controller 302 then sends a dummy carrier signal to the data station 12 from the output terminal P1b of the ATM switch 201 via the optical fiber transmission line 31a' in order to prevent the data station 12 from transmitting the next frame to the packet switching unit 11b via the optical fiber transmission line 31a. Detecting the dummy carrier signal, the data station 12 waits transmitting the next frame for a specified period of time. When the input/output port P2 is put in the idle state, the controller 302 takes out one of the connection requests stored in the data buffer (queue) 301 and according to the request, controls the ATM switch 201 to connect the input terminal P1a to the output terminal P2b. The ATM switch 201 connects the input terminal P1a to the output terminal P2b under the control of the controller 302 so that the input-signal processing circuit 203a may transfer a fixed size of data to the output-signal processing circuit 204b. The data transferred to the output-signal processing circuit 204b is converted into an optical signal at the electro-optic converter 205b and then transmitted to the data station 13 in frame form via the optical fiber transmission line 31b'.

Detecting the end delimiter field (ED) 47 of the received frame, which means that there is no data left in the input-signal processing circuit 203a, the processing circuit 203a sends a disconnection request to the controller 302. Receiving the disconnection request, the controller 302 controls the ATM switch 201 so that the connection between the input terminal P1a and the output terminal P2b is cut off, which completes the data transfer operation.

As described so far, even in the packet switching-mode network system, addresses are able to be automatically entered in the address table T2. Thus, when a data station is switched to another input/output port, the contents of the address table T2 are automatically updated by the transmission frame from the data station. As a result, even when the connection of a data station is changed, it is not necessary to update the address table T2 through human intervention, which achieves an efficient data exchange between data stations.

In both the line switching network system of FIG. 10 and the packet switching network system of FIG. 12, the switching operation of the line switching unit 11a and packet switching unit 11b controls data transfer between data stations. Therefore, high-speed data transmission can be achieved by collecting high speed elements into those switching units, which makes it unnecessary to use expensive high-speed elements for each data station. As a result, it is possible to achieve high speed transmission with a transmission speed of, for example, more than 100 Mbps, using a relatively-low-cost network system.

Additional advantages and modifications will readily occur to those skilled in the art. Therefore, the invention in its broader aspects is not limited to the specific details, and representative devices shown and described herein. Accordingly, various modifications may be made without departing from the spirit or scope of the general inventive concept as defined by the appended claims and their equivalents.

What is claimed is:

1. A star local-area network system comprising a plurality of data stations and a circuit switching unit for switching connections between the data stations, wherein said circuit switching unit comprises:
   a plurality of ports to which said plurality of data stations are connected;
   table means in which each port has a storage area for storing the address assigned to each data station;
   address registration means for, when said circuit switching unit receives a registration command from each of said data stations, entering a source address contained in the command in said storage area corresponding to the port which received the command;
   switching means installed between said plurality of ports, for switching the connection between the ports; and
   switch controlling means for referring to said table means to detect the port corresponding to a destination data station specified by a destination address contained in a received message data, and then controlling said switching means to that the port which received said message data can be connected to the port to which said destination data station is connected.

2. A star local-area network system according to claim 1, wherein said table means further has a second storage area for each port, which stores first status information which indicates whether or not data transfer through each port is taking place.

3. A star local-area network system according to claim 2, wherein said switch controlling means further includes sensing means which refers to said first status information in said table means to sense whether the port to which said destination data station is connected is busy or not, and informing means which when the port to which said destination data station is connected is found busy, informs a source data station that said destination data station is busy.

4. A star local-area network system according to claim 3, wherein said plurality of data stations include interrupting means which interrupts data transmission when it is informed by said switch controlling means that said destination data station is busy.

5. A star local-area network system according to claim 2, wherein said switching means further includes registration means which enters the first status information, indicating that data transfer is taking place, in said second storage areas each corresponding to the port which received said data and the port to which said destination data station is connected, when said switching means is controlled so as to connect the port which received said data to the port to which said destination data station is connected.

6. A star local-area network system according to claim 1, wherein each of said plurality of data stations is a circuit switching mode data terminal which transmits a frame containing a destination address field, a source address field, a control field, and an information field, with said control field including said address registration request command.

7. A star local-area network system according to claim 1, wherein each of said plurality of data stations is connected to a port of said circuit switching unit via optical transmission medium and said circuit switching unit further includes a first converting means which coverts an optical signal transmitted from each of said plurality of data stations via said optical transmission medium into an electric signal, and a second converting means which converts the electric signal from said switching means into an optical signal and then supplies it to said optical transmission medium.

8. A star local-area network system comprising a plurality of data stations and a packet switching unit for allowing data exchange between the data stations, wherein said packet switching unit comprises:
  a plurality of ports to which said plurality of data stations are connected;
  table means in which each port has a storage area for storing the address assigned to each data station;
  address registration means for, each time said packet switching unit receives a message data from each of said data stations, entering a source address, contained in the message data, in said storage area corresponding to the port which received the message data;
  switching means installed between said plurality of ports, for switching the connection between the ports; and
  switch controlling means for referring to said table means to detect the port corresponding to a destination data station specified by a destination address contained in a received message data, and then controlling said switching means so that said received message data can be transferred to the port to which said destination data station is connected.

9. A star local-area network system according to claim 8, wherein said table means further has a second storage area for each port, for storing first status information which indicates whether or not data transfer through each port is taking place.

10. A star local-area network system according to claim 9, wherein said switch controlling means further includes sensing means for referring to said first status information in said table means to sense whether the port to which said destination data station is connected is busy or not, and informing means for when the port to which said destination data station is connected is found busy, informing a source data station that said destination data station is busy.

11. A star local-area network system according to claim 10, wherein said plurality of data stations include interrupting means for interrupting data transmission when it is informed by said switch controlling means that said destination data station is busy.

12. A star local-area network system according to claim 9, wherein said switching means further includes registration means for entering the first status information indicating that data transfer is taking place in said second storage areas, each corresponding to the port which received said data and the port to which said destination data station is connected, when said switching means is controlled so as to transfer said received message data to the port to which said destination data station is connected.

13. A star local-area network system according to claim 8, wherein each of said plurality of data stations is a packet-switching mode data terminal which transmits a frame containing a destination address field, a source address field, a control field, and an information field.

14. A star local-area network system according to claim 8, wherein each of said plurality of data stations is connected to a port of said packet switching unit via an optical transmission medium, and said packet switching unit further includes:
  a first converting means for converting an optical signal transmitted from each of said plurality of data stations via said optical transmission medium into an electrical signal, and
  a second converting means for converting the electric signal from said switching means into an optical signal and for supplying the optical signal to said optical transmission medium.

15. A star local-area network system comprising a plurality of data stations and a central switching unit for switching connection between the data stations, wherein said central switching unit comprises:
  a plurality of ports to which said plurality of data stations are connected;
  table means for storing address information showing a relationship between addresses of said data stations and said plurality of ports, each of said addresses being stored in a storage area corresponding to each of said ports;
  address registration means for, when said central switching unit receives a message data from each of said data stations, entering a source address contained in the message data received from said data station, in said storage area corresponding to the port which received the message data, thereby updating said address information;
  switching means installed between said plurality of ports, for switching the connection between the ports; and
  switch controlling means for referring to said table means to detect the port corresponding to a destination data station specified by a destination address contained in a received message data, and then controlling said switching means so that the port which received said message data can be connected to the port to which said destination data station is connected.

16. A star local-area network system according to claim 15, wherein said table means further has a second storage area for each port, for storing first status information which indicates whether or not data transfer is taking place through each port.

17. A star local-area network system according to claim 16, wherein said switch controlling means further includes:
  sensing means for referring to said first status information in said table means to sense whether the port to which said destination data station is connected is busy or not, and informing means for, when the port to which said destination data station is connected is found busy, informing a source data station that said destination data station is busy.

18. A star local-area network system according to claim 17, wherein said plurality of data stations include interrupting means for interrupting data transmission when it is informed by said switch controlling means that said destination data station is busy.

19. A star local-area network system according to claim 16, wherein said switching means further includes registration means for entering the first status information indicating that data transfer is taking place in said second storage areas, each corresponding to the port which received said data and the port to which said destination data station is connected, when said switching means is controlled so as to connect the port which received said data to the port to which said destination data station is connected.

20. A star local-area network system according to claim 15, wherein said central switching unit is a circuit switching unit, and said address registration means enters said source address in said table means in response to the address registration request command transmitted from said data station.

21. A star local-area network system according to claim 20, wherein each of said plurality of data stations is a circuit switching mode data terminal for transmitting a frame containing a destination address field, a source address field, a control field, and an information field, with said control field including said address registration request command.

22. A star local-area network system according to claim 15, wherein said central switching unit is a packet switching unit and said address registration means includes means for entering said source address in said table means each time it receives data from said data station.

23. A star local-area network system according to claim 22, wherein each of said plurality of data stations is a packet-switching mode data terminal for transmitting a frame containing a destination address field, a source address field, a control field, and an information field.

24. A star local-area network system according to claim 15, wherein each of said plurality of data stations is connected to a port of said central switching unit via an optical transmission medium, and said central switching unit further includes:

a first converting means for converting an optical signal transmitted from each of said plurality of data stations via said optical transmission medium into an electric signal, and second converting means for converting the electric signal from said switching means into an optical signal and then supplies it to said optical transmission medium.

* * * * *

UNITED STATES PATENT AND TRADEMARK OFFICE
CERTIFICATE OF CORRECTION

PATENT NO.  :   5,140,585

DATED       :   August 18, 1992

INVENTOR(S) :   Masataka Tomikawa

It is certified that error appears in the above-identified patent and that said Letters Patent is hereby corrected as shown below:

Claim 1, column 12, line 41, change "to" to --so--.

Claim 8, column 13, line 40, change "switching the connection" to --allowing data change--.

Claim 8, column 13, line 45, after "in" change "a" to --said--.

Claim 14, column 14, line 24, change "electrical" to --electric--.

Claim 15, column 14, line 54, after "in" change "a" to --said--.

UNITED STATES PATENT AND TRADEMARK OFFICE
CERTIFICATE OF CORRECTION

PATENT NO. : 5,140,585
DATED : August 18, 1992
INVENTOR(S) : Masataka Tomikawa

It is certified that error appears in the above-indentified patent and that said Letters Patent is hereby corrected as shown below:

Claim 15, column 14, line 55, change "then" to --for--.

Signed and Sealed this

Second Day of November, 1993

Attest:

BRUCE LEHMAN

*Attesting Officer*     Commissioner of Patents and Trademarks